United States Patent [19]

Vogelgesang

[11] Patent Number: 4,575,778
[45] Date of Patent: Mar. 11, 1986

[54] TAPE CASSETTE CONTAINING RUN COUNTER DISC

[75] Inventor: Peter J. Vogelgesang, Roseville, Minn.

[73] Assignee: Minnesota Mining and Manufacturing Company, Saint Paul, Minn.

[21] Appl. No.: 457,905

[22] Filed: Jan. 14, 1983

[51] Int. Cl.[4] ............ G11B 23/02; G11B 5/008; G11B 15/00; G11B 17/00
[52] U.S. Cl. ............ 360/132; 360/137; 360/93; 242/199; 116/309; 235/103
[58] Field of Search ............ 360/137, 132, 83, 85, 360/93; 242/199, 55; 116/215, 309, 318; 235/103, 95 C

[56] References Cited

U.S. PATENT DOCUMENTS

| 3,604,624 | 9/1971 | Miura et al. | 235/103 |
| 3,630,170 | 12/1971 | Christe | 116/114 |
| 3,678,215 | 7/1972 | Kihara | 179/100.2 |
| 3,916,167 | 10/1975 | Cook | 235/103 |
| 3,995,319 | 12/1976 | Harris | 360/137 |
| 4,217,614 | 8/1980 | Balson | 360/132 |
| 4,274,605 | 6/1981 | Gruber, Jr. | 242/55 |
| 4,466,584 | 8/1984 | Chevalier et al. | 360/132 |

FOREIGN PATENT DOCUMENTS

| 0118855 | 4/1943 | Australia | 235/103 |
| 2151514 | 4/1971 | Fed. Rep. of Germany | 360/132 |
| 2808861 | 9/1979 | Fed. Rep. of Germany | 360/137 |
| 56-155482 | 12/1981 | Japan | 235/103 |

Primary Examiner—Stuart N. Hecker
Assistant Examiner—Alfonso Garcia
Attorney, Agent, or Firm—Donald M. Sell; James A. Smith; William L. Huebsch

[57] ABSTRACT

A tape use counting mechanism in a cassette comprising a numbered disc which is advanced one numbered space for each play cycle by friction drive from a supporting tape reel under control of pawls actuated by a lever contacting the reeled tape.

2 Claims, 3 Drawing Figures

U.S. Patent   Mar. 11, 1986   4,575,778
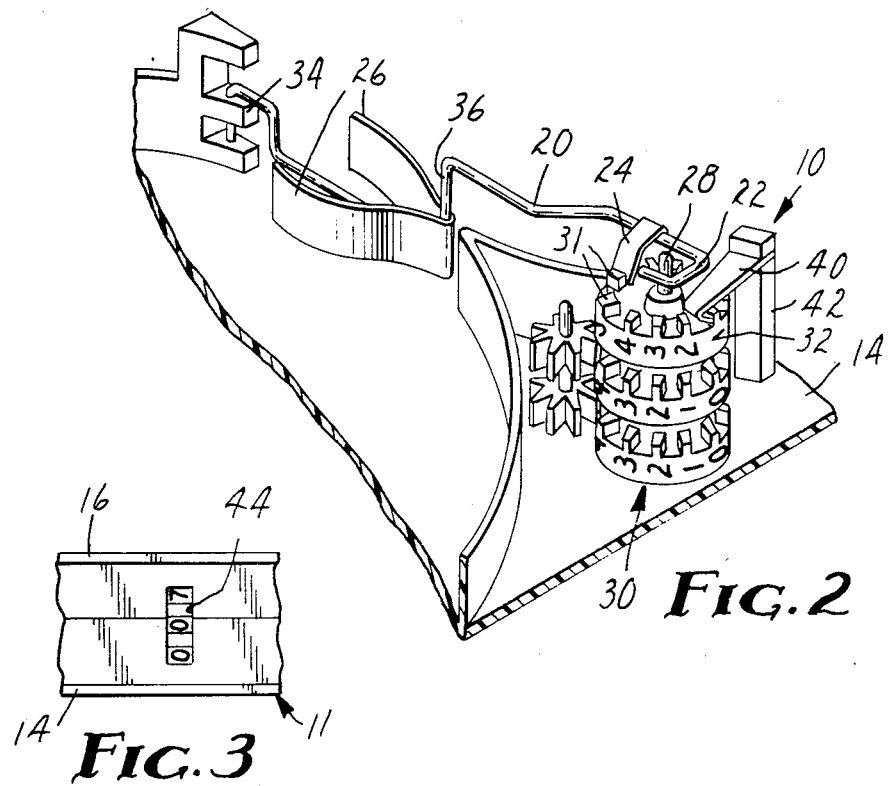
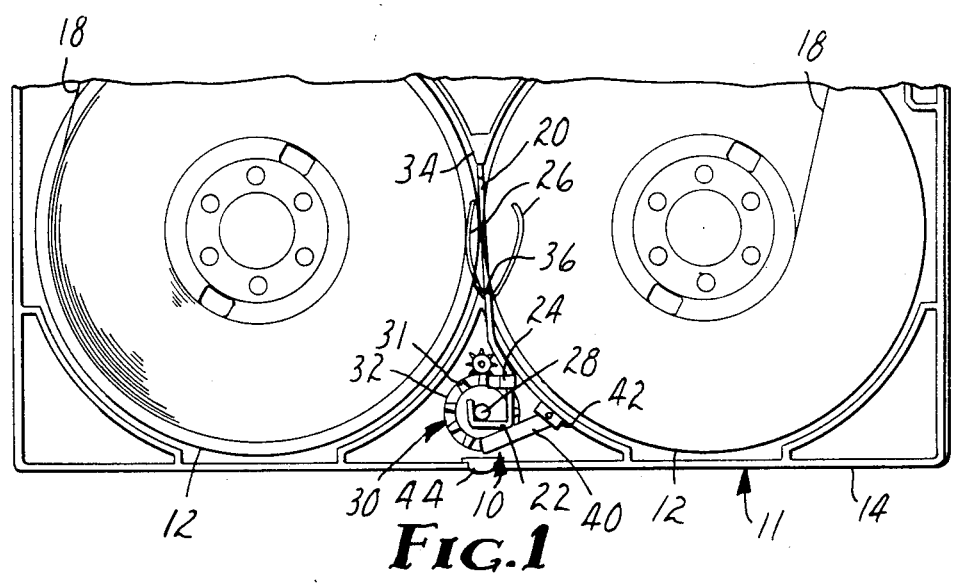

TAPE CASSETTE CONTAINING RUN COUNTER DISC

TECHNICAL FIELD

This invention relates to the tape cassette art. In one specific aspect the invention relates to cassettes containing prerecorded video program magnetic recording tapes and means for counting the number of showings of the recorded material.

BACKGROUND ART

Video tape record cassettes are commonly distributed on a rental basis. It is therefore important to be able to determine the number of times a taped program is displayed, both for calculating the rental fee and for anticipating wear or deterioration of the tape.

Attempts have previously been made to determine playing time of video cassettes. U.S. Pat. No. 3,604,624 connects an incremental indicator to the drive shaft of the recorder for indicating the time of play during a single showing. A pivoted pointer mounted between the reels and contacting the tape on one reel is used in U.S. Pat. No. 3,630,170 to measure the time of play. U.S. Pat. No. 3,678,215 counts the number of times the cassette is inserted into and removed from the recorder. A pivoted sensing arm riding against the reeled tape advances a digital counter in U.S. Pat. No. 3,995,319.

DISCLOSURE OF INVENTION

The present invention provides a simple and compact tape use counting mechanism wherein a numbered disc is incrementally advanced during repeated rewindings of the tape on a tape reel, advancement being regulated by an escapement device actuated by the reeled tape.

The tape use counting mechanism according to the present invention comprises the number disc which is fitted over and against a flange of the reel; means for frictionally driving the disc from the reel; first means for preventing rotation of the disc in one direction; second means for preventing rotation of the disc in the other direction; and third means for disengaging the second means and for preventing rotation of the disc in said other direction when the tape reel is being filled.

DETAILED DESCRIPTION

Figure 1:
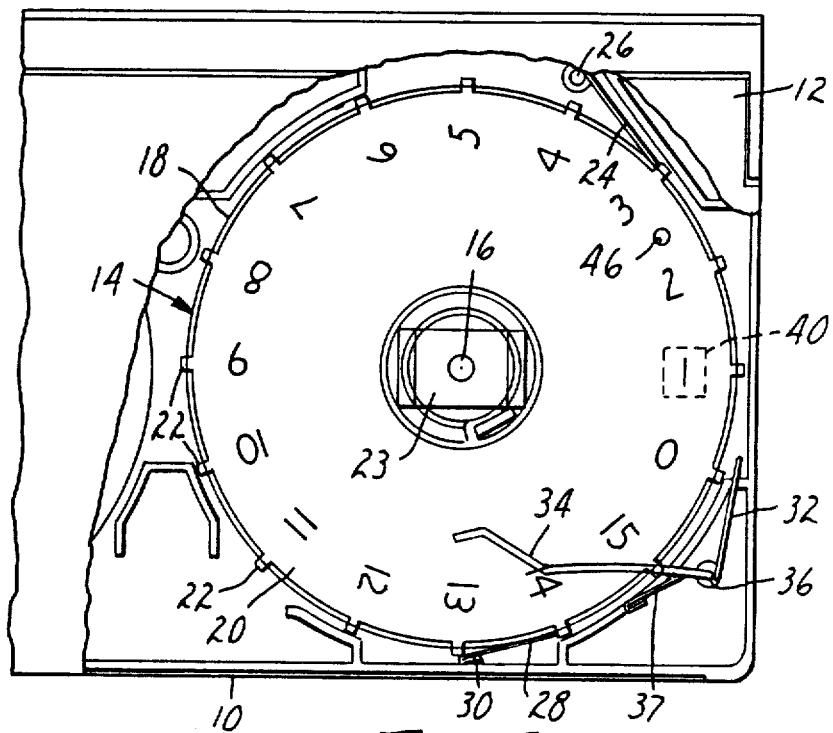
FIG. 1 is a partial top plan view of a cassette body containing a tape takeup reel and showing the elements of the tape use counting mechanism of this invention.

Referring now to the drawing, there is shown a corner section of a cassette having a base 10 and a cover 12, and containing a tape takeup reel 14 having a central hub protrusion 16 on an upper flange 18. The reel is driven from the lower side of the base 10, by means not shown.

A thin plastic disc 20 is laid over and against the upper flange 18, a central aperture in the disc fitting the hub protrusion 16. The disc 20 has a diameter slightly less than that of the flange 18 and carries uniformly spaced projections 22 extending slightly beyond the circumference of the flange 18. Adjacent each such projection 16 the disc 20 carries one of a sequence of numbers as shown.

The disc 20 is held against the flange 18 by a resilient clutch strip 23 of plastic film to provide pressure sufficient to cause the disc 20 to rotate with the reel 14 unless prevented from doing so by the control mechanism now to be described.

A first leaf spring pawl 24 supported on a post 26 permits rotation of the disc 20 in the direction of increasing number value, here shown to be the clockwise direction, but prevents reverse rotation by contact with one of the projections 22.

A second leaf spring pawl 28 carried by a post 30 acts in the opposite direction by contact with another of the projections 22.

A third leaf spring pawl 32 is carried on a sensing arm 34 which pivots within a supporting post 36. Spring bias is provided, e.g., by a leaf spring 37, to maintain the curved free end of the arm 34 in contact with tape wound about the reel 18 during such times as the reel 18 is more than about one-half filled. As the reel fills beyond about one-half, the arm 34 is forced to swing outwardly, thereby swinging the attached pawl 32 against the edge of the reel 18 and into position to engage one of the projections 22. Continued increase in the diameter of the reeled tape then causes the arm 34 to press against the end of the pawl 28 to disengage it from the adjacent projection 22, and thereby to permit the disc 20 to advance until stopped by the pawl 32.

The cover 12 mates against the base to enclose the tape use counting mechanism described above, and presses against the clutch strip 23. It has a transparent window 40 in position to provide a view of each of the numbers of the sequence carried by the disc 20 as the disc is rotated.

The spacing of the pawls 24, 28 and 32 is such that the disc 20 advances one numbered position for each complete cycle of emptying and refilling of the reel 14 with tape. As illustrated in the drawing, the number disc 20 will be seen to provide a total of 16 positions. Systems with lesser or greater numbers of positions are possible but the number shown is well adapted for many situations and provides for ample space as well as generally adequate control.

In some situations it may be found desirable to bring the counter quickly to the zero position without the necessity of unwinding and rewinding the tape through an appropriate number of cycles. For such purposes it is contemplated to provide an opening in the cassette base 10 or cover 12 for the insertion of a reset key to release spring pawl 24 and to engage a zero indexing depression 46 in the disc. Rotation of the reel 18 in the counterclockwise direction then rotates the disc 20 in the same direction until it is returned to and held in the zero position, whereupon the key is withdrawn and reverse rotation of the disc 20 is again prevented by pawl 24.

I claim:

1. A counting mechanism for determining the number of times a length of tape is wound onto and then off of a reel including a hub rotatably mounted on a housing about which hub the tape is wound, and a flange projecting along a side surface of tape wound about the hub, said mechanism comprising a disc having spaced numbers positioned against and centered on the surface of the flange opposite the hub; means for frictionally driving said disc from said reel; first means adapted for engagement between said housing and said disc for preventing rotation of the disc in one direction while permitting rotation of the disc in the other direction; second means adapted for engagement between the housing and said disc at predetermined spaced locations related to the spacings between the numbers that, when engaged, will prevent rotation of the disc in the other direction; and third means adapted to be operated by the changing diameter of a coil of tape being wound onto and then off of the hub for disengaging said second means from one location and affording re-engagement of said second means at another location to cause incremental advance of the disc by said means for frictionally driving to change the location of the numbers relative to the housing.

2. A counting mechanism according to claim 1 wherein said disc includes a plurality of spaced projections projecting past said flange and has one of said numbers adjacent each of said projections, with said first and second means comprising pawls mounted on said housing and adapted to engage opposite sides of said projections, and said third means comprises sensing means pivotally supported on the housing and extending within said reel and biased for making contact with tape wound about the hub at greater than about one-half reel capacity during winding and unwinding of the tape; said sensing means being adapted to contact and disengage said second pawl means when said reel is substantially filled with reel tape, and comprising pawl means for engaging one of said projections to limit rotation of said disc in said other direction while said second pawl means is disengaged by said sensing means.

* * * * *

UNITED STATES PATENT AND TRADEMARK OFFICE
CERTIFICATE OF CORRECTION

Page 1 of 3

PATENT NO. : 4,575,778
DATED : March 11, 1986
INVENTOR(S) : Peter J. Vogelgesang It is certified that error appears in the above-identified patent and that said Letters Patent is hereby corrected as shown below:

The title page should be deleted to appear as per attached title page.

Figure 2:
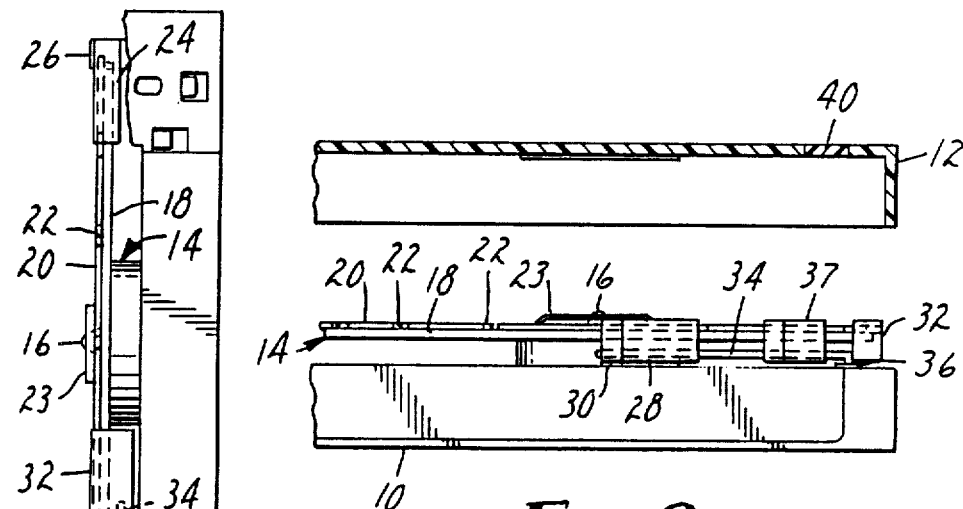
FIG. 2 is a side elevation of the structure of FIG. 1 and including a cover.
Figure 3:
FIG. 3 is an end elevation of the structure of FIG. 1.

Figures 1-3 should be deleted to appear as per attached Figures.

Signed and Sealed this

Eighth Day of September, 1987

*Attest:*

DONALD J. QUIGG

*Attesting Officer*      *Commissioner of Patents and Trademarks*

United States Patent [19]
Vogelgesang

[11] Patent Number: 4,575,778
[45] Date of Patent: Mar. 11, 1986

[54] TAPE CASSETTE CONTAINING RUN COUNTER DISC

[75] Inventor: Peter J. Vogelgesang, Roseville, Minn.

[73] Assignee: Minnesota Mining and Manufacturing Company, Saint Paul, Minn.

[21] Appl. No.: 457,905

[22] Filed: Jan. 14, 1983

[51] Int. Cl.⁴ .............. G11B 23/02; G11B 5/008; G11B 15/00; G11B 17/00

[52] U.S. Cl. .................. 360/132; 360/137; 360/93; 242/199; 116/309; 235/103

[58] Field of Search ............ 360/137, 132, 83, 85, 360/93; 242/199, 55; 116/215, 309, 318; 235/103, 95 C

[56] References Cited

U.S. PATENT DOCUMENTS

| | | | |
|---|---|---|---|
| 3,604,624 | 9/1971 | Miura et al. | 235/103 |
| 3,630,170 | 12/1971 | Christe | 116/114 |
| 3,678,215 | 7/1972 | Kihara | 179/100.2 |
| 3,916,167 | 10/1975 | Cook | 235/103 |
| 3,995,319 | 12/1976 | Harris | 360/137 |
| 4,217,614 | 8/1980 | Balson | 360/132 |
| 4,274,605 | 6/1981 | Gruber, Jr. | 242/55 |
| 4,466,584 | 8/1984 | Chevalier et al. | 360/132 |

FOREIGN PATENT DOCUMENTS

| | | | |
|---|---|---|---|
| 0118855 | 4/1943 | Australia | 235/103 |
| 2151514 | 4/1971 | Fed. Rep. of Germany | 360/132 |
| 2808861 | 9/1979 | Fed. Rep. of Germany | 360/137 |
| 56-155482 | 12/1981 | Japan | 235/103 |

Primary Examiner—Stuart N. Hecker
Assistant Examiner—Alfonso Garcia
Attorney, Agent, or Firm—Donald M. Sell; James A. Smith; William L. Huebsch

[57] ABSTRACT

A tape use counting mechanism in a cassette comprising a numbered disc which is advanced one numbered space for each play cycle by friction drive from a supporting tape reel under control of pawls actuated by a lever contacting the reeled tape.

2 Claims, 3 Drawing Figures

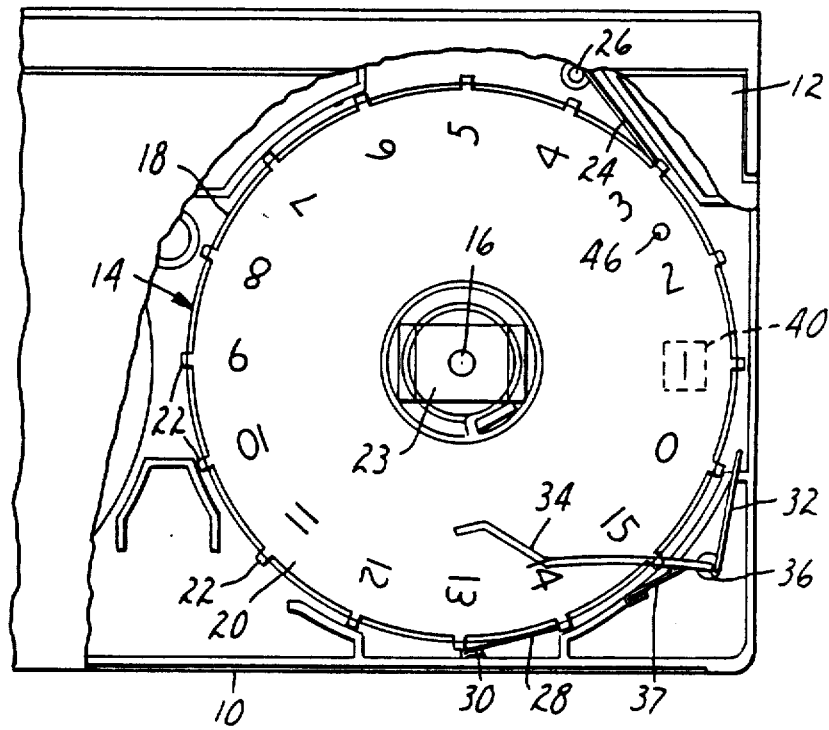

Patent No. 4,575,778